United States Patent [19]

Hickham, Jr.

[11] Patent Number: 4,815,994

[45] Date of Patent: Mar. 28, 1989

[54] OUTBOARD MOTOR STEERING LUBRICATION

[75] Inventor: I. Wilburn Hickham, Jr., Ingleside, Tex.

[73] Assignee: I.W.H. Co., Inc., Ingleside, Tex.

[21] Appl. No.: 181,696

[22] Filed: Apr. 14, 1988

[51] Int. Cl.[4] .................................. B63H 25/00
[52] U.S. Cl. ......................... 440/62; 74/89.15; 74/502.6; 440/63; 440/88; 440/113
[58] Field of Search ............. 440/61, 113, 62, 53, 440/88, 59; 74/89.14, 89.15, 480 B, 502.6; 184/6.19, 105.3, 18, 21, 24

[56] References Cited

U.S. PATENT DOCUMENTS

| | | | |
|---|---|---|---|
| 3,143,994 | 8/1964 | Morse | 440/62 |
| 3,144,916 | 8/1964 | Lien | 184/105.3 |
| 3,774,568 | 11/1973 | Borst et al. | 440/62 |

Primary Examiner—Joseph F. Peters, Jr.
Assistant Examiner—Edwin L. Swinehart
Attorney, Agent, or Firm—G. Turner Moller

[57] ABSTRACT

A technique for lubricating a standard outboard motor steering mechanism comprises removing and discarding the conventional nut captivating the motor tilt tube to the motor brackets. A hole is drilled through the tilt tube. The conventional nut is replaced with a nut having a radial threaded passage through which lubricant is added to the interior of the tilt tube where the steering mechanism is located. The nut of this invention includes an interior groove so the tilt tube hole and radial passage do not have to be radially aligned. In another embodiment, a similar looking arrangement is incorporated into one of the motor brackets through which the tilt tube extends.

11 Claims, 2 Drawing Sheets

OUTBOARD MOTOR STEERING LUBRICATION

This invention relates to a technique for lubricating the steering mechanism of an outboard motor driven boat.

The present standard outboard motor steering mechanism comprises a cable assembly having an input end operatively connected to the steering wheel of the boat so that turning of the steering wheel rotates the cable about its axis. The cable assembly extends to the rear of the boat and terminates in an output unit comprising a worm gear assembly mounted inside a pair of telescoping tubes. The tubes are positioned in a tilt tube received in the motor brackets. The outermost tube acts a linearly moveable output ram which is connected to a link arm assembly to pivot the motor about a generally vertical axis to turn the boat in one direction or the other. Outboard steering mechanisms of this type are made by several manufacturers, one of which is Teleflex Inc., 640 North Lewis Road, Limerick, Pennsylvania 19468. In the event more information is needed relating to this type steering mechanism, reference is made to publications of Teleflex Inc. Similar outboard motor steering mechanisms are found in U.S. Pat. Nos. 3,863,593 and 3,774,568.

Although such steering mechanisms work well and are reasonably durable, the telescoping tubes and gear mechanism are prone to corrode and freeze up, particularly in salt water environments. When this occurs, the only recourse is to replace the entire cable mechanism extending from the input unit to the output ram.

The difficulty with modern outboard motor steering mechanisms of this type is that lubricant cannot easily be added to the telescoping tubes and the worm gear mechanism therein. The only apparent technique for lubricating the output end of the steering cable assembly is to dismantle it. Easy lubrication is precluded by the design of the cable steering mechanism. The cable end of the tilt tube is sealed by the coupler nut securing the steering cable assembly to the tilt tube. The output or ram end of the tilt tube is sealed by an assembly which acts to wipe the outer tube on each cycle of movement.

The obvious approach for lubricating the steering cable mechanism is to provide a grease or lubrication fitting on the steering mechanism itself, as shown in U.S. Pat. No. 3,143,994. The manufacturers of steering cable mechanisms have apparently found it to their advantage not to provide such fittings because no presently available steering cable mechanism is so equipped.

In contrast, and in accordance with one embodiment of this invention, an after market approach to the problem is provided by removing the nut captivating the tilt tube to the motor brackets, replacing it with a nut that allows one to add lubricant, and drilling a hole in the tilt tube to allow lubricant to enter the compartment housing the telescoping tubes of the steering assembly. More specifically, the steering assembly coupling nut is unthreaded from the tilt tube, the steering assembly is removed from the tilt tube, the nut captivating the tilt tube to the motor brackets is removed and thrown away, a nut of this invention having a threaded radial passage therein is threaded onto the tilt tube, a hole is drilled through the tilt tube using the radial passage as a guide, the steering assembly is reinserted into the tilt tube, the coupling nut is replaced, lubricant is added through the radial passage and the passage is then plugged. In this fashion, lubricant can be added to the output end of the steering mechanism as desired.

The nut of this invention provides a threaded radial passage therein communicating with a groove intermediate the ends of the threaded axial passage. A grease zert or plug is threaded into the radial passage to control entry of lubricant.

The problem can also be overcome by proper design of the brackets through which the tilt tube extends. In another embodiment of this invention, at least one of the brackets through which the tilt tube extends has been modified to provide a lubrication opening which communicates through an opening in the tilt tube to deliver lubricant to the telescoping tubes of the steering cable mechanism. The lubrication opening is preferably threaded to receive a grease zert or plug.

It is an object of this invention to provide a method and apparatus for lubricating an outboard motor steering mechanism.

Another object of this invention is to provide an after market solution to lubricating a conventional outboard motor steering mechanism in a simple and easy manner.

A further object of this invention is to provide a modified motor bracket allowing lubrication of a conventional outboard motor steering mechanism.

Other objects and advantages of this invention will become apparent as this description proceeds, reference being made to the accompanying drawing and appended claims.

IN THE DRAWINGS

Figure 1:
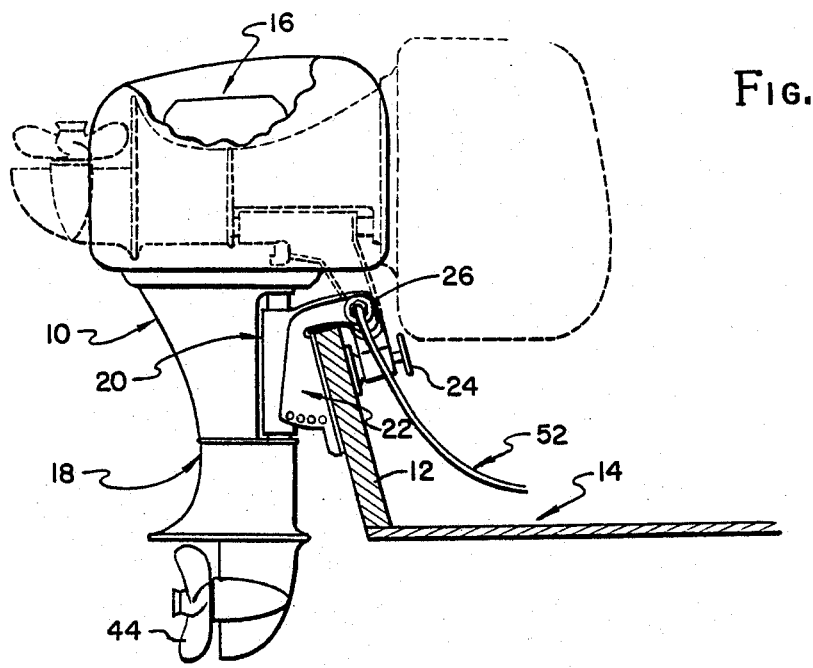
FIG. 1 is a side elevational view of an outboard motor mounted on the rear of a boat.
Figure 2:
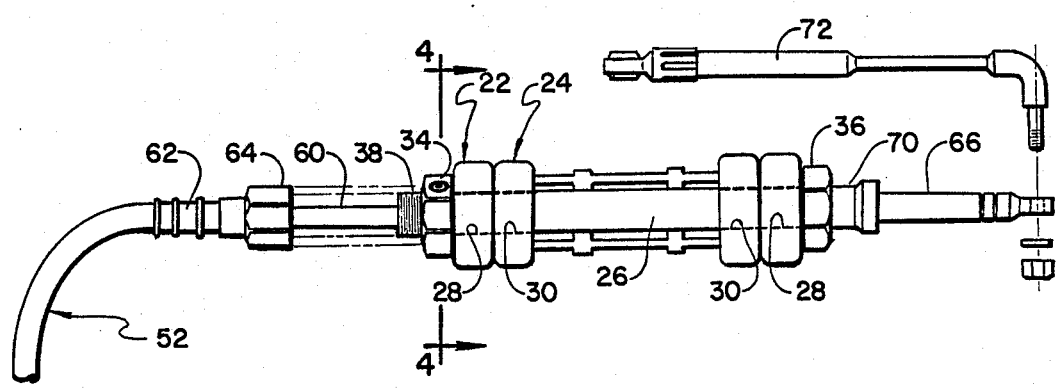
FIG. 2 is a partial enlarged front view of the motor of FIG. 1, illustrating the steering cable assembly, motor brackets, tilt tube, and link arm, certain parts being exploded away for clarity of illustration.

Referring to FIGS. 1 and 2, an outboard motor 10 is mounted on a transom 12 of a boat 14. The motor 10 includes an engine 16, lower unit 18 and support 20 carrying the engine 16 and lower unit 18. A first set of brackets 22 is secured to the transom 12 in any suitable fashion. A second set of brackets 24 are located inside the brackets 22 and are attached to or comprise part of the support 20. A tilt tube 26 extends through unthreaded coaxial passages 28, 30 in the brackets 22, 24, supports the motor 10 on the brackets 22 and allows the brackets 24 and motor 10 to tilt about an axis 32 to raise and lower the motor 10 in and out of the water. Nuts 34, 36 on the threaded ends 38 captivate the tilt tube 26 to the brackets 22, 24.

Figure 3:
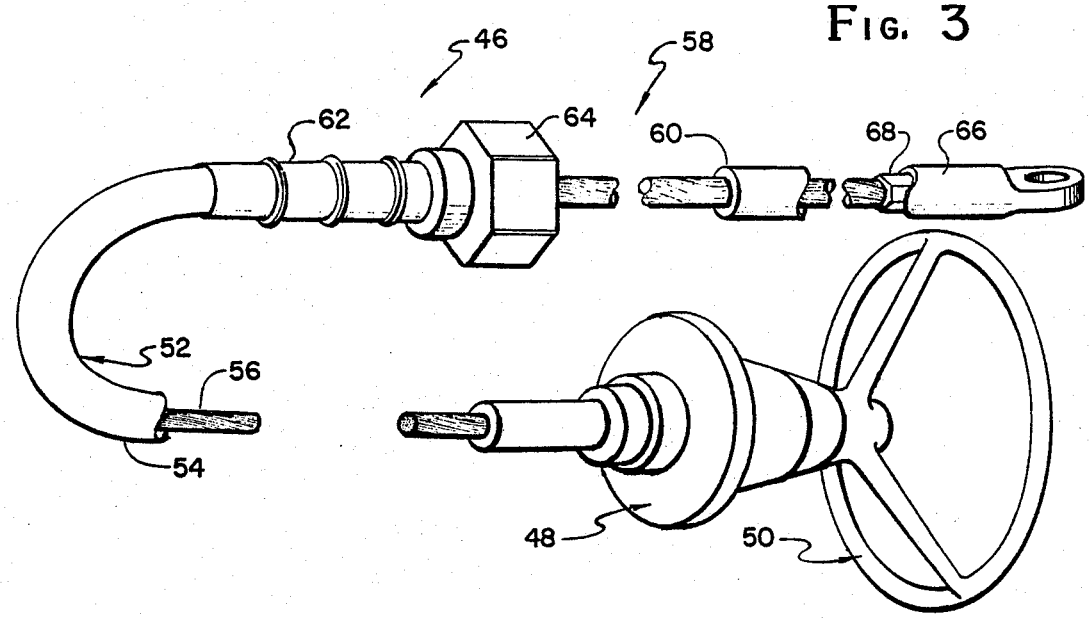
FIG. 3 is a schematic view of a conventional steering cable mechanism.
Figure 6:
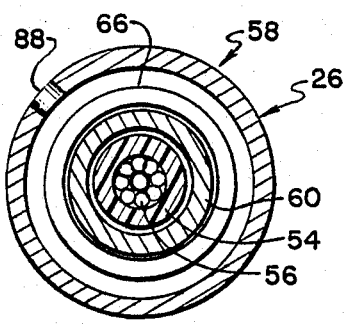
FIG. 6 is an enlarged cross-sectional view of the tilt tube end of FIG. 5, taken substantially along line 6—6 thereof as viewed in the direction indicated by the arrows.

In the early days, the motor 10 was manually tilted about the axis 32 and manually steered by pivoting the motor 10 about an upstanding pin 42 to direct the propeller 44 to opposite sides of the boat axis. More recently, powered mechanisms (not shown) are provided to tilt the motor 10 and the boat 14 is steered by a steering cable mechanism 46 shown in FIG. 3.

The cable steering mechanism 46 includes an input unit 48 rotated by a steering wheel 50, a length of cable assembly 52 including an outer non-rotating sheath 54 and an inner rotating cable 56 and an output unit 58. The output unit 58 comprises a first tube 60 secured to a fitting 62 and extending past a coupler nut 64 rotatable on the fitting 62 for securing the output unit 58 to the tilt tube 26. An outer tube 66 telescopes on the inner tube 60 and moves toward and away therefrom in response to rotation of the steering wheel 50. Accordingly, the tubes 60, 66 house a mechanism 68 for converting rotation of the cable 56 into reciprocation of the tube 66. The mechanism 68 may be of any suitable type, such as a worm gear arrangement (not shown) in the conventional Teleflex steering cable or the arrangement shown in U.S. Pat. Nos. 3,774,568 or 3,863,593.

The second tube 66 comprises an output ram of the steering mechanism 46 and extends through a wiper assembly 70 carried by the tilt tube 26 adjacent the nut 36. The tube 66 is connected to the motor 10 by a link arm 72. As will be apparent to those skilled in the art, rotation of the steering wheel 50 in one direction retracts the outer tube 66 t move the motor 10 in one rotary direction about the pin 42 while rotation of the steering wheel 50 in the other direction extends the outer tube 66 thereby moving the motor 10 in the opposite rotary direction. Those skilled in the art will recognize the motor 10 and steering cable mechanism 46, as heretofore discussed, as typical of modern outboard motor steering arrangements.

Figure 4:
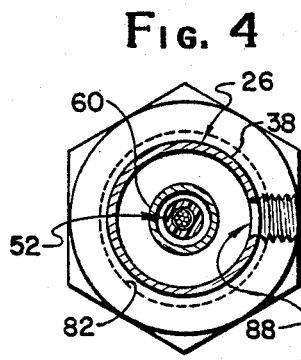
FIG. 4 is an enlarged cross-sectional view of the assembly of FIG. 2, taken substantially along line 4—4 thereof as viewed in the direction indicated by the arrows.
Figure 5:
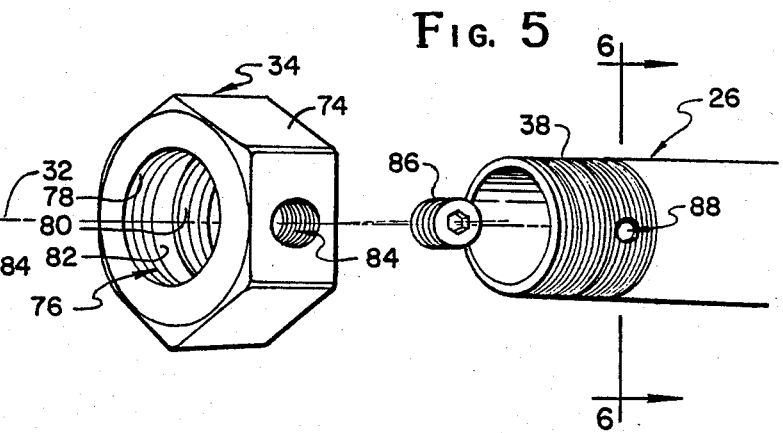
FIG. 5 is an enlarged isometric view of the nut of this invention exploded away from the tilt tube end.

The nut 34 comprises an important part of this invention. As shown best in FIGS. 4 and 5, the nut 34 includes a body 74 preferably of stainless steel, brass or other non-corrodible material having a regular polygonal exterior to receive a wrench. A central axis passage 76 provides a pair of identically sized, shaped and directioned thread sets 78, 80, each of which comprises an extension of the other in the sense that a threaded member passes through both thread sets 78, 80. The sets 78, 80 are interrupted by a groove or recess 82 which preferably extends 360° about the axis 32. The groove 82 is thus of larger internal diameter than the roots of the threads in the passage 76. The nut 34 is readily made by machining the groove 82 after the threads 78, 80 are cut.

A much smaller threaded passage 84 extends radially from the exterior of the nut 34 into communication with the groove 82. A grease zert or preferably a solid, exteriorly threaded plug 86 is received in and seals the radial passage 84.

To install the nut 34, the link arm 72 is first disconnected from the output tube 66 as suggested in FIG. 2. The coupler nut 64 is unthreaded and the fitting 62 pulled to the left in FIG. 2. This pulls the inner and outer tubes 60, 66 out of the tilt tube 26 thereby leaving the tilt tube 26 empty and open from each end, the wiper assembly 70 remaining in place on the end of the tilt tube 26. The original nut (not shown) at the location of the nut 34 is unthreaded and thrown away. The nut 34 is threaded onto the end 38 of the tilt tube 26 and tightened with minimum torque. The plug 86 is removed from the nut 34 and a radial hole 88 is drilled in the tilt tube 26. This is preferably done by extending a drill (not shown) through the passage 84 because this positions the hole 88 at an axial location on the threaded end 38 which corresponds with the groove 82. Any metal shavings are removed from the tilt tube 26 and the drilled hole 88 is deburred.

In the alternative, a drill location may be marked on the threaded end 38 by extending a pencil lead (not shown) through the passage 84 and the nut 34 removed. After drilling the hole 88, the nut 34 is replaced.

The steering cable output unit 58 is reinserted into the tilt tube 26 and the coupler nut 64 rethreaded onto the end 38 of the tilt tube 26. The steering wheel 50 is preferably rotated to extend the output ram tube 66 to its limit thereby maximizing the volume inside the tilt tube 26. Lubricant is added through the passage 84, preferably with a long necked oil can or plastic bottle. Although many lubricants or greases may be used, a preferred lubricant is EP-90 Lower Unit oil. The plug 86 is threaded into the passage 84 and the steering wheel 50 rotated to center the output tube 66. This decreases the volume inside the tilt tube 26 and causes the lubricant to flow into the annular gap between the inner and outer tubes 60, 66 and into the mechanism 68. Because the tilt tube 26 is not sealed relative to the passages 28, 30 through the motor brackets 22, 24, lubricant oozes out of the motor brackets 22, 24.

To oil the tubes 60, 66 and mechanism 68 at a later date, the only thing that need be done is remove the plug 86, add lubricant through the passage 84 and reinsert the plug 86. It will seen that the modification of the prior art motor-steering mechanism in accordance with this invention is simple and easy. The preexisting nut (not shown) can be removed, the nut 34 installed and lubricant can be added by a person relatively handy with tools but with no prior experience in about twenty minutes. Adding lubricant at a later time takes no more than five minutes.

In the approach discussed above, the conventional nut 36 is not moved. If it were desired, the nut 36 could be replaced with the nut 34 and the tilt tube 26 drilled at the opposite end.

Figure 7:
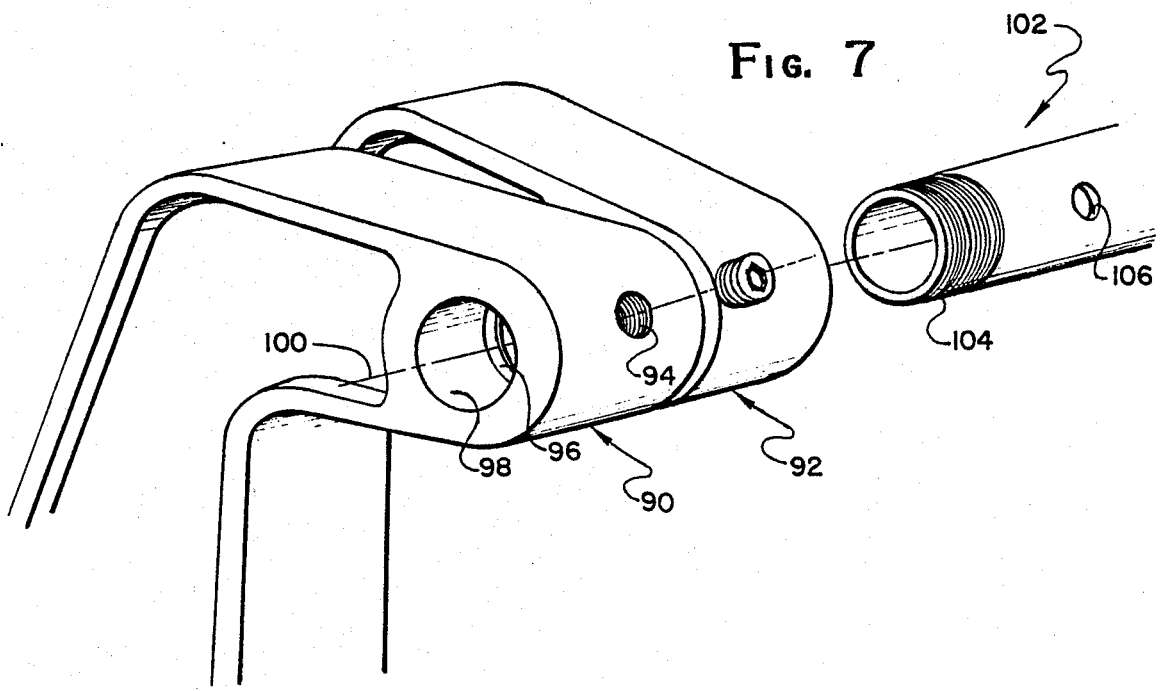
FIG. 7 is an enlarged cross-sectional view of a modified motor bracket allowing lubrication of the steering mechanism in accordance with this invention.

Referring to FIG. 7, one of the motor brackets 90, 92 corresponding to the brackets 22, 24, is modified in accordance with this invention. A radial threaded passage 94 communicates with a groove 96 inside an unthreaded passage 98 receiving the tilt tube. The groove 96 preferably extends 360° about a tilt tube axis 100. The tilt tube 102, adjacent to but spaced from the threaded end 104, has been drilled to provide a radial passage 106 at an axial location corresponding to the groove 96 in the assembled position of the motor of which the brackets 90, 92 are a part. This allows lubricant to reach the interior of the tube 102 thereby lubricating the inner tube, outer tube and worm gear mechanism of the cable steering mechanism.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A method of lubricating an outboard steering mechanism comprising a tilt tube having first and second ends providing threaded sections, first and second pairs of motor brackets receiving the tilt tube, nuts on -the first and second ends captivating the tilt tube and motor brackets, a steering cable assembly extending through the tilt tube and having a steering cable extending from the first tilt tube end, an output ram extending from the second tilt tube end and a coupler nut securing the steering cable to the first tilt tube end, the method comprising removing one of the nuts from the tilt tube and exposing a tilt tube threaded section;

drilling a hole through the exposed tilt tube threaded section;

threading onto the exposed tilt tube threaded section a nut having a radial passage therethrough and recaptivating the tilt tube and motor brackets; and adding lubricant to the tilt tube through the radial passage.

2. The method of claim 1 wherein the drilling step is conducted after the nut having the radial passage is threaded onto the exposed tilt tube.

3. The method of claim 1 further comprising the step of plugging the radial passage after adding a lubricant therethrough.

4. The method of claim 1 further comprising the step of removing the output ram of the steering mechanism from the tilt tube before drilling the tilt tube threaded section.

5. The method of claim 1 wherein the step of removing one of the nuts from the tilt tube comprises removing the nut on the first tilt tube end and the drilling step comprises drilling the hole through the tilt tube adjacent the first tilt tube end.

6. An outboard motor of the type comprising an engine, lower works and a housing supporting the engine and lower works, a first set of brackets for connection to a boat transom and providing a first pair of aligned passages therethrough defining an axis, a second set of brackets connected to the housing and providing a second pair of aligned co-axial passages therethrough, a tilt tube extending through the first and second set of passages and mounting the motor for tilting movement about the tilt tube, the tilt tube comprising first and second threaded ends, first and second threaded nuts on the first and second threaded ends captivating the first and second brackets on the tilt tube, the improvement comprising means for lubricating a cable steering mechanism received in the tilt tube wherein one of the brackets provides an internal groove intermediate the ends thereof and a threaded radial passage communicating with the groove, wherein the tilt tube provides a radial passage therethrough communicating with the groove and further comprising an externally threaded plug in the radial passage.

7. The outboard motor of claim 6 further comprising a cable steering mechanism including a cable rotatable by a steering wheel having an output end located inside the tilt tube, the output end including a first tube rigid with the tilt tube and a second tube telescopingly received on the first tube and movable in response to rotation of the cable, the first and second tubes being in communication with the tilt tube radial passage.

8. The outboard motor of claim 6 wherein the threaded plug is a solid member.

9. An outboard motor of the type comprising an engine, lower works and housing supporting the engine and lower works, a first set of brackets for connection to a boat transom and providing a first pair of aligned passages therethrough defining an axis, a second set of brackets connected to the housing and providing a second pair of aligned co-axial passages therethrough, a tilt tube extending through the first and second set of passages and mounting the motor for tilting movement about the tilt tube, the tilt tube comprising first and second threaded ends, nuts on the first and second threaded ends captivating the first and second brackets on the tilt tube, and a cable steering mechanism including a cable rotatable by a steering wheel having an output end located inside the tilt tube, the output end including a first tube, a coupler nut threadably received on the first tilt tube end and a second tube telescopingly received on the first tube and movable in response to rotation of the cable, the improvement comprising means for lubricating the cable steering mechanism received in the tilt tube wherein one of the nuts provides an internal groove intermediate the ends thereof and a threaded radial passage communicating with the groove, wherein the tilt tube provides a radial passage therethrough communicating with the groove and further comprising an externally threaded plug in the radial passage.

10. The outboard motor of claim 9 wherein the threaded plug is a solid member.

11. The outboard motor of claim 9 wherein the nut having the internal groove is on the first tilt tube end.

* * * * *